Sheet 1. 2 Sheets.
Sylla and Adams,
Mower.
No. 725. Reissued May 17. 1859.
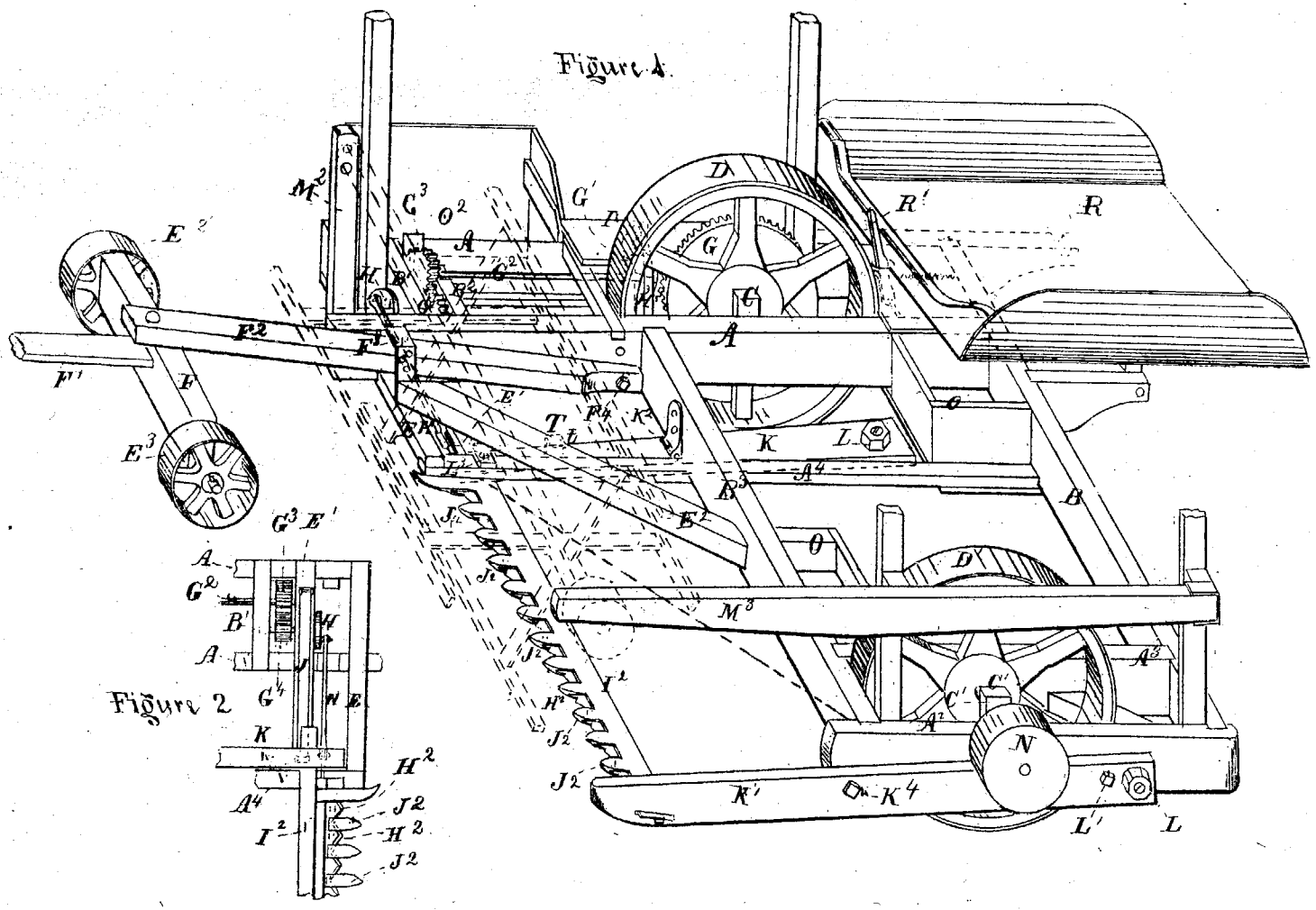

Sylla. and. Adams.
Mower.
No 7235
Reissued May. 17. 1859.
Sheet 2. 2 Sheet.
Figure 3.
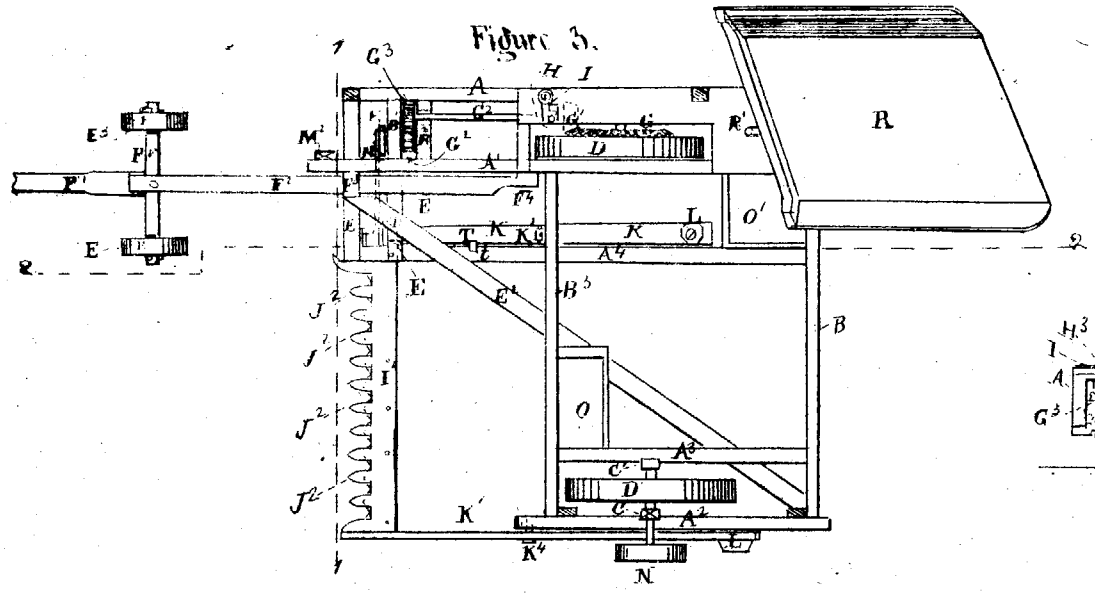
Figure 4.
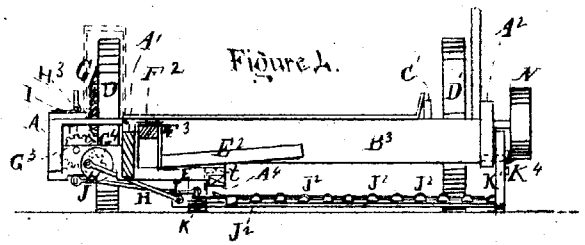
Figure 5.
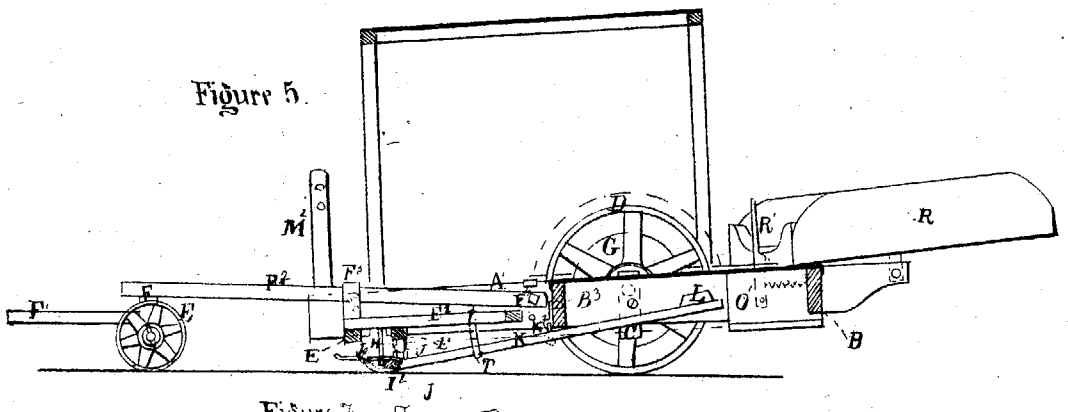
Figure 6.
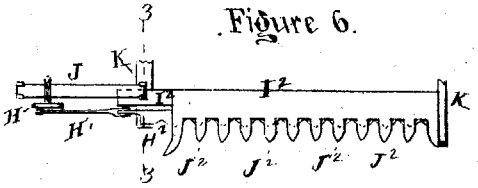
Figure 7.

UNITED STATES PATENT OFFICE.

PHILO SYLLA, OF ELGIN, AND AUGUSTUS ADAMS, OF SANDWICH, ILLINOIS, ASSIGNORS TO C. AULTMAN & CO., OF CANTON, OHIO.

IMPROVEMENT IN GRAIN AND GRASS HARVESTERS.

Specification forming part of Letters Patent No. 10,038, dated September 20, 1853; Reissue No. 725, dated May 17, 1859.

DIVISION E.

*To all whom it may concern:*

Be it known that PHILO SYLLA, of Elgin, in the county of Kane and State of Illinois, and AUGUSTUS ADAMS, formerly of the same place, but now residing at Sandwich, in the county of De Kalb, in said State, invented certain new and useful Improvements in Machines for Harvesting Grain, Mowing Grass, &c., of which the following is a full, clear, and exact description, reference being had to the annexed drawings, which make part of this specification, and in which—

Figure 1 is a view in perspective of a machine, showing one mode of applying said improvements, the finger-beam being raised from the ground to adapt the machine for reaping. Fig. 2 represents a plan of a portion of the under side of the machine, to exhibit more fully the flexible connection of the finger-beam with the main frame. Fig. 3 represents a plan of the machine, the finger-beam resting on the ground to adapt the machine for mowing. Fig. 4 represents a vertical transverse section of the machine at the line 1 1, Fig. 3. Fig. 5 represents a vertical longitudinal section of the same at the line 2 2 of Fig. 3; and Fig. 6 represents a plan of the cutting apparatus, the finger-beam, and the coupling-arm for connecting the finger-beam to the main frame. Fig. 7 is a vertical section at the line 3 3 of Fig. 6, showing the provision for allowing play in the joint between the finger-beam $I^2$ and the yielding bar K.

That side of the machine which runs next the standing grain we call the "left" side, and the other, at which the horses are placed, we call the "right" side.

The accompanying drawings represent a machine having a frame large enough to support, in addition to the cutting apparatus and machinery required for mowing, a removable platform placed behind the cutter, (such as is common in ordinary machines adapted to reaping and mowing,) an elevated table behind the platform to bind the grain upon, stands for a raker and binders, a dumping-tray to carry the sheaves until a sufficient quantity for a shock has accumulated and then to dump them in a heap upon the ground, and a stand or place for the driver of the team by which the machine is drawn.

Whenever it may be expedient to use one or more of the several parts or branches of said improvements separate from the rest, such part or parts might be used in connection with frames and gearing more convenient than those herein described, which are proportioned and arranged with reference to the use of the whole of the parts together; and it is obvious that several parts of the said improvements are applicable to various other reaping or mowing machines in use. One mode of applying each of these improvements to practical use is shown in this machine. It is therefore unnecessary to specify the manner of applying the parts, respectively, to other machines, as the ordinary skill of a constructer is sufficient for that purpose.

In machines for mowing, as usually constructed, the finger-beam bears far too heavily upon the ground, and it is desirable that the finger-beam, especially if its connection with the main frame be flexible, should not bear upon the ground with any greater pressure than is necessary to prevent it from bouncing up whenever it comes in contact with slight protuberances, as any excess of pressure beyond this only causes the beam to hug the ground more closely, increasing the friction and direct and side draft of the machine without any countervailing advantage. Moreover, in a machine having a finger-beam connected to the main frame by a coupling-arm, that end of the beam which is next the gearing has to support one end of the shackle-bar that drives the cutter, and one end of the coupling-arm, and is therefore borne upon the ground more heavily than the opposite end, and prevented from rising as readily and conforming as freely as it otherwise would to the undulations of the ground.

To overcome such difficulties is the object of the invention which is the subject of this patent, and which consists, first, in combining with that end of the finger-beam next the main frame a counter-balance sufficient to prevent it from bearing upon the ground more heavily than the opposite end, thus rendering the pressure of the beam upon the ground equal at both ends; and, second, in a removable counterbalance for each or either end of the beam, to counteract in any degree desired the pressure of its weight upon the ground.

In the accompanying drawings, the main frame A A′ $A^2$ $A^3$ $A^4$ B B′ $B^2$ $B^3$ E E′ $E^2$ is supported upon two wheels, D and D′, whose journals rest in bearings in blocks C C′, made adjustable to set the frame at a variable distance from the ground. This frame is heavier in front of than behind the axis of the wheels D D′, and the preponderating weight is sustained by a truck in front, composed of two wheels, $E^3$ $E^3$, and an axle, F, and connected with the main frame by a draft-bar, $F^2$, hinged at its rear end on a pivot, $F^4$, to the beam A′ of the frame. For the purpose of allowing the front of the main frame to be raised, lowered, and held at different heights, the draft-bar passes through a strap, $F^3$, attached to the beams E and A′, and a wedge placed between the top of the strap and the draft-bar holds the front of the frame at any required height within the range of adjustment allowed by the strap, and it may be lowered by withdrawing the wedge, and may be held down by placing the wedge between the under side of the draft-bar and the bottom of the strap. A like effect may be produced by passing a pin through the strap, above or below the draft-bar, in the holes made for the pin in the sides of the strap. By these means the connection of the draft-bar with the frame may by turns be limber or rigid, and the front of the frame set at various heights from the ground. When the wedge and pin are withdrawn the front of the main frame and the front end of the tongue, respectively, are free to play up and down within the limits of the strap independently of each other. The ends attained by the adjustment already described may likewise be attained to a certain extent by adjusting the pivot $F^4$, on which the rear end of the draft-bar $F^2$ hinges, from one hole to another in a series formed for its reception in the side of the beam A.

The tongue F′, by which the horses draw the machine, is attached to and extends forward from the axle of the truck.

The motion of the cutter in this machine is derived from one of the wheels which carry the main frame. On the side of the right wheel, D, a bevel-wheel, G, is secured, which takes into and drives a pinion, G′, on a counter-shaft, $G^2$, which also carries a spur-wheel; $G^3$, that takes into and drives a pinion, $G^4$, on the end of a shaft whose opposite end carries a crank, H, which, through a connecting-rod, H′, jointed to the cutter-bar $H^2$, communicates a vibratory motion to a cutter arranged to play through a series of guard-fingers, $J^2$, projecting from the front side of the finger-beam $I^2$. The bearing of that end of the shaft $G^2$ which carries a pinion, G, is in an upright arm, $H^3$, hinged at its lower end to the frame, so that by turning this arm toward or from the wheel D the pinion may be thrown into or out of gear with the wheel to put the cutter into or out of motion. The pinion is held in either position at will by means of a notched detent, I, pivoted to the main frame.

The cutter $H^2$ and guard-fingers $J^2$ are of the usual construction and supported by the finger-beam in the usual manner.

The right end of the finger-beam $I^2$ is connected to the frame by means of a strong link or coupling-arm, J, hinged at its left end to the right end of the finger-beam and at its right end to a cross-beam, E′, of the main frame.

The progressive motion of the frame on its wheels carries forward the coupling-arm, and that in its turn carries forward the finger-beam and cutter, and as the coupling-arm is rigid laterally only, and its left end (to which the finger-beam is connected) free to rise and fall, the finger-beam necessarily rests on the surface of the ground. Therefore in passing over undulating ground the finger-beam will rise or fall at either or both ends and sway up and down within certain limits, as may be required, to conform to the surface of the ground.

The coupling-arm and finger-beam are supported by a yielding bar or brace, K, extending from the junction of the left end of the coupling-arm with the right end of the finger-beam backward, and connected by a hinge, $K^2$, to the cross-bar $B^3$ of the frame, and in order that this bar may in no way (not even by its weight) hinder the upward and downward movements of the finger-beam its rear end is extended some distance behind its hinge $K^2$, and is enlarged to counterbalance by its weight not only the weight of its front end, but also that of the coupling-arm and of the connecting-rod, which gives motion to the cutters, so that the right end of the finger-beam may bear as lightly on the ground and be as free to rise and fall as the left end. Since, however, this machine is designed for reaping as well as mowing, and must therefore be capable of carrying a platform whenever it is required to be used as a reaper, and must likewise be capable of carrying the finger-beam at the same time at a height of several inches above the ground, a second yielding bar, K′, is provided to support the left end of the finger-beam, to which it is attached at its forward end, and is hinged to the side rail, $A^2$, of the frame on a pivot, $K^4$. This bar extends backward from the pivot $K^4$, that its rear end may counterbalance its forward end, and thus avoid loading the left end of the finger-beam. The bars K and K′ are fitted with removable weights L, to counterpoise a part of the weight of the finger-beam to make it slide as lightly over the ground as may be desired. The forward ends of both the yielding bars are connected with the finger-beam, one of them, at least, not rigidly, but both strongly, so as to give the requisite support to the beam without preventing it from swaying freely or rising and falling within certain limits at either end unrestrained by the opposite end.

The remaining portions of the machine, which relate more particularly to branches of the improvements of the said inventors other than that which is the subject of this patent, are described more fully in other patents therefor of the same date as this, and further description of them here is consequently deemed unnecessary.

What is claimed under this patent as the invention of the said SYLLA and ADAMS is—

1. The combination of a counterpoise-weight, or the equivalent thereof, with that end of the finger-beam next the main frame, to equalize its pressure upon the ground, substantially as set forth.

2. The combination of a counterpoise-weight, or the equivalent thereof, with each or either end of the finger-beam, to diminish its pressure upon the ground, substantially as set forth.

In testimony whereof we have hereunto subscribed our names.

CORNELIUS AULTMAN,
LEWIS MILLER,
THOMAS R. TONNER,
JACOB MILLER,
GEORGE COOK,

*Composing the firm of C. Aultman & Co.*

Witnesses:

DANIEL GOTSHALL,
ISAAC HAZLETT.